United States Patent Office 2,909,264
Patented Oct. 20, 1959

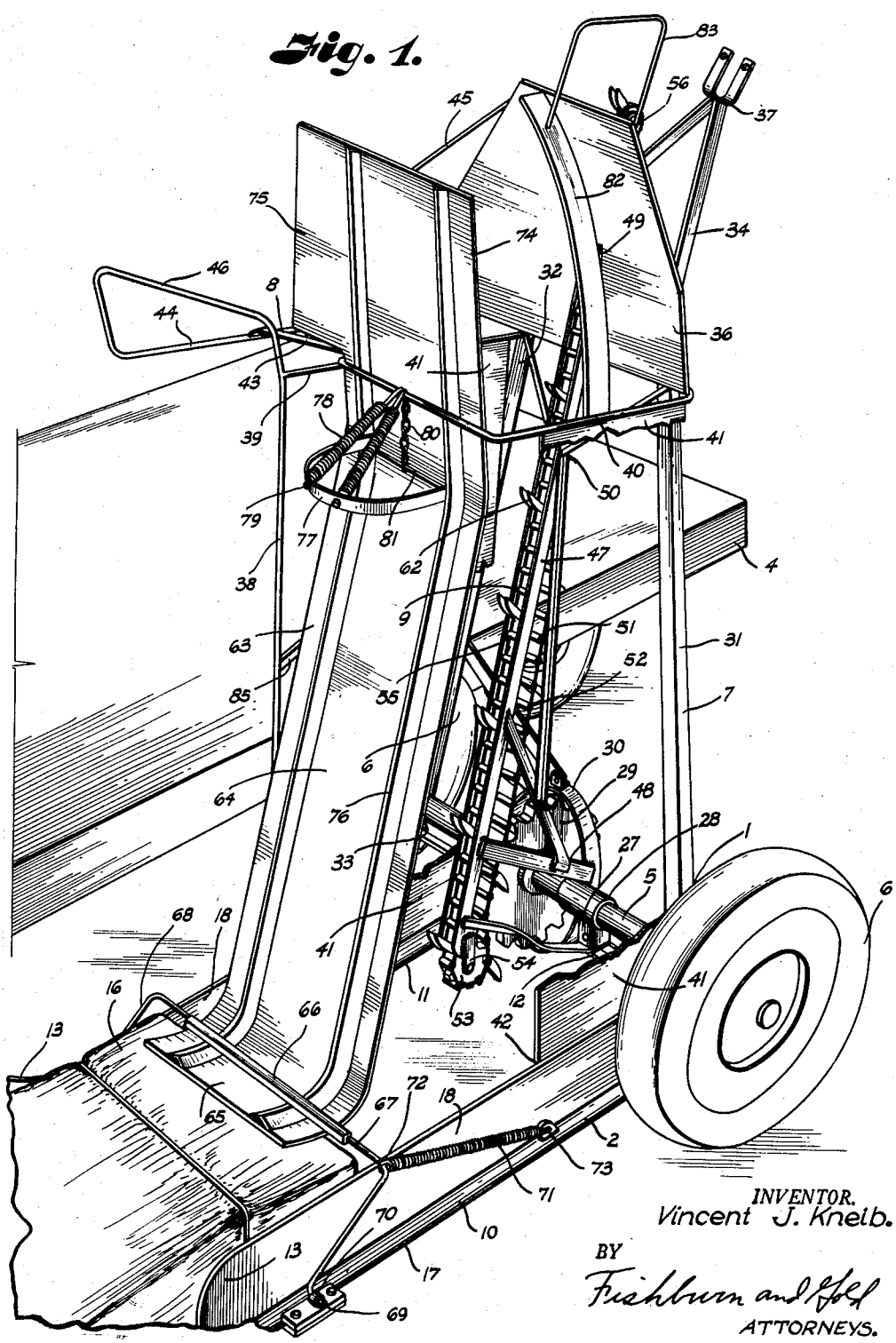

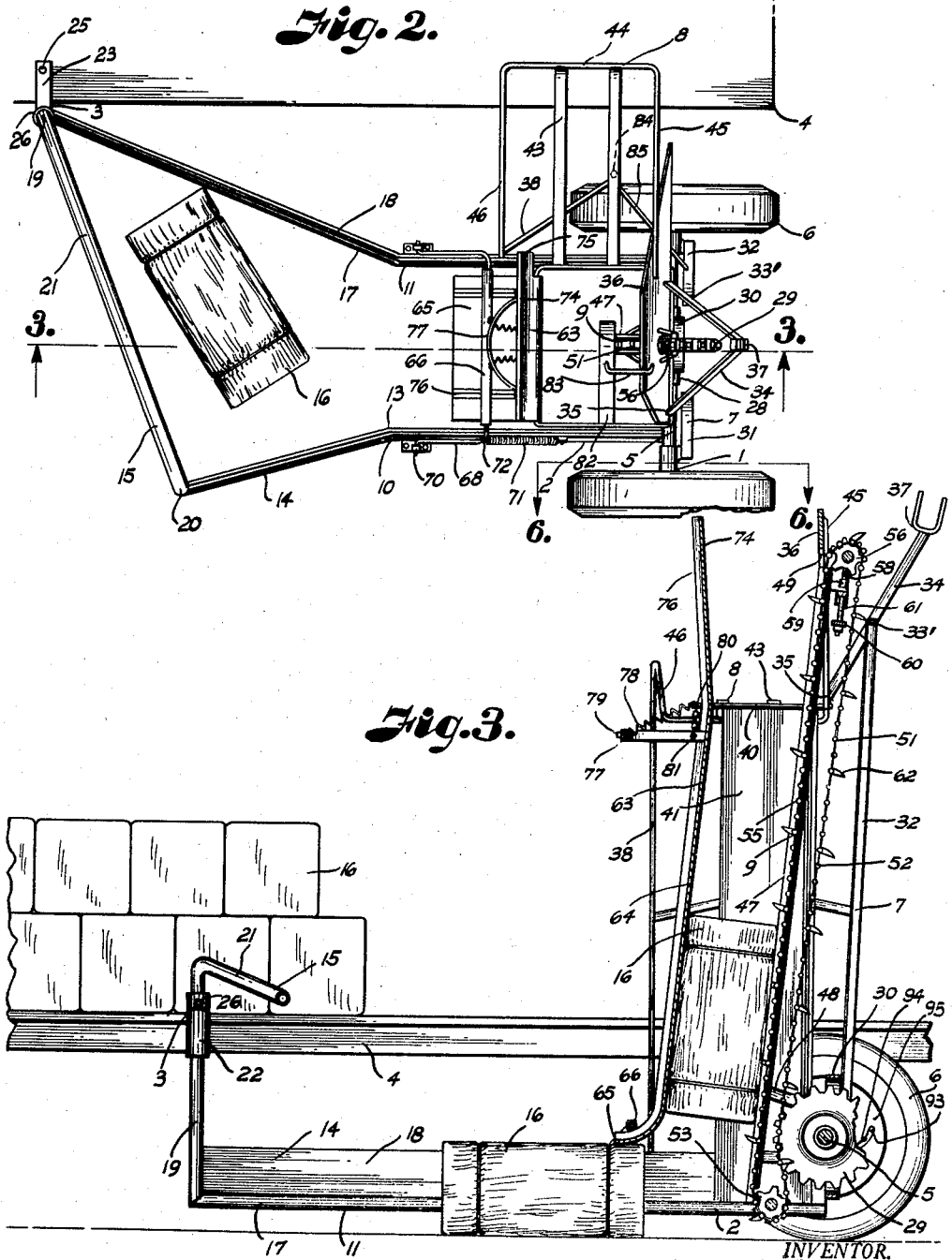

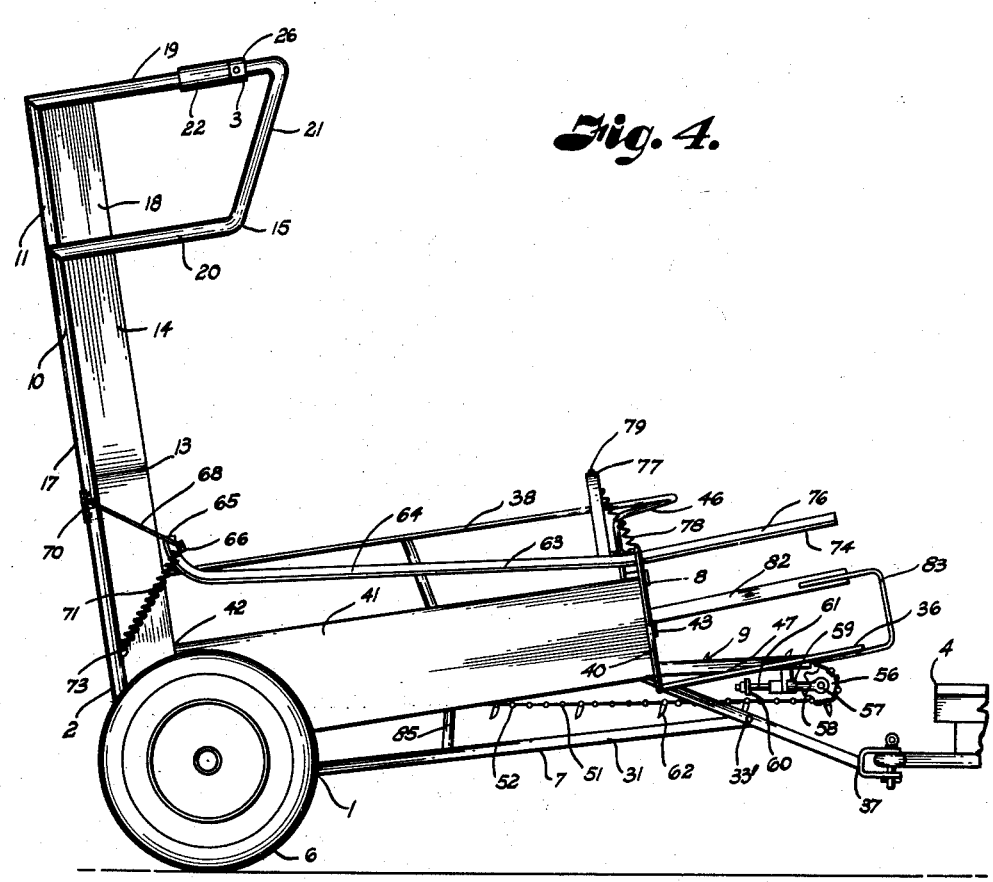

2,909,264

BALE LOADING MACHINE

Vincent J. Kneib, St. Joseph, Mo.

Application November 5, 1956, Serial No. 620,422

1 Claim. (Cl. 198—7)

This invention relates to bale loading machines, and more particularly, to machines that are moved through a field to pick up and elevate the bales for loading onto a wagon or like carrier and is a continuation in part of my co-pending application on "Bale Loading Machine," Serial No. 509,238, filed May 18, 1955, now Patent No. 2,785,810.

It is common practice to use what is termed "pickup balers" that will pick up loose mowed hay and the like, move same into the baler where it is packed and tied, and the bale discharged therefrom on to the ground. Some machines produce round bales and others what are termed "square" bales, but in either instance, the bales discharged from the balers may lie in a haphazard row extending across a field. In the past, many and various types of mobile agricultural loading machines have been developed for loading bales on to wagons or the like, but such structures are usually large, expensive machines that become jammed when the bales are close together, and in some instances, the discharge of the bale on to the wagon provides a hazard to the operator. Bale loaders as have been used in the past are large, relatively long or otherwise of such structures that present difficulties in being moved from one location to another.

The objects of the present invention are to provide a bale loading machine with ground-engaging wheels at the rearward portion thereof and with an adjustable hitch at the forward portion for attachment to the side of a wagon, truck or other vehicle whereby the hitch and ground-engaging wheels support the bale loading machine for movement along the ground with said wagon, truck or other vehicle and elevate successive bales to a position above the level of the wagon or truck bed; to provide such a loading machine with a wheel supported axle at the rearward portion thereof to supply driving power for an elevating conveyor; to provide such a loading machine with spaced rearwardly converging members for straightening and guiding bales into the elevating mechanism; to provide such a bale loading machine with an elevating mechanism including a conveyor and bale guide with a discharge at a level above the truck or wagon bed wherein the conveyor is on a steep incline and the length of the machine relatively short; to provide such a bale loading machine with a tow hitch at the upper rear portion of the machine whereby said machine may be tipped to engage said tow hitch with a towing vehicle for movement of the machine from one location to another; to provide such a bale loading machine with overrunning drive mechanism in the wheel supported axle whereby in towing said machine the conveyor mechanism is stationary; to provide such a bale loading machine wherein a pair of ground-engaging wheels and one hitch support the machine during loading operations and said pair of wheels and another hitch at the opposite end support the machine while being towed behind a vehicle; and to provide a bale loading machine which is economical to manufacture, efficient in operation and easily supported and moved.

In accomplishing these and other objects of the present invention, I have provided improved details of structure, the preferred form of which is illustrated in the accompanying drawings, wherein:

Fig. 1 is a perspective view of the elevating portion of the bale loading mechanism alongside a wagon or the like.

Fig. 2 is a plan view of a bale loading machine attached to a wagon or the like.

Fig. 3 is a vertical sectional view through the bale loading mechanism on the line 3—3, Fig. 2.

Fig. 4 is a side elevation of the bale loading machine positioned for towing behind a vehicle for movement from one location to another.

Fig. 5 is a transverse sectional view through the connection of the bale loading machine to the wagon or the like.

Fig. 6 is a transverse sectional view through the overrunning drive between the ground-engaging wheels and the rear axle, taken on the line 6—6, Fig. 2.

Referring more in detail to the drawings:

1 designates a mobile bale loading machine including a frame 2 having a connection 3 with a truck, wagon or the like 4. The rear portion of the frame is supported by an axle 5 having spaced ground-engaging wheels 6 thereon and adjacent the rearward portion of the frame is an upstanding standard or frame portion 7 carrying a discharge platform 8 at an elevation above the wagon bed. The frame and upstanding portion thereof carries an elevating conveyor 9 for picking up and elevating bales to be loaded on to the wagon 4.

The frame 2 includes a pair of opposed side rails 10 and 11 connected at their rear ends by a transverse member 12. The rearward portion of the side rails 10 and 11 are preferably substantially parallel and spaced a distance slightly greater than the width of a bale to be loaded, the parallel portions of the rails extending forwardly from the transverse member 12 and terminating as at 13 in diverging or flaring wing portions 14, with the forward end of said wings connected by an arch-like member 15 forming an opening of suitable width for receiving bales 16 in a haphazard row whereby the flaring portion of the wings tend to form guides directing the bales into the space between the parallel portions of the frame side rails 10 and 11. The flaring wings and side rails cooperate to define a path for the bales to the conveyor.

In the particular structure illustrated, and in keeping with light weight and ample rigidity, the side rails 10 and 11 include tubular metal members 17 with upstanding sheet metal members 18 secured throughout the length thereof to provide a suitable height to guide the bales resting on the ground into the elevating mechanism. Various forms of side rails may be utilized; however, it is preferable that smooth and rounded surfaces be presented for engagement with the bale for eliminating possibility of tearing of same. The forward ends of the side rails 10 and 11 are suitably connected to the lower ends of spaced vertical legs 19 and 20 of the arch member 15, the upper ends of said legs 19 and 20 being connected by a transverse upper member 21 of said arch member. The leg 19 is arranged to be adjacent the wagon or the like 4 and the connection 3 includes a sleeve 22 slidably mounted on the leg 19, said sleeve having vertically spaced ears 23 extending laterally therefrom to engage above and below a portion of the wagon bed, the ears 23 having suitable apertures therein adapted to align with an aperture 24 in the wagon bed for receiving suitable fastening devices 25 for securing the sleeve to the wagon bed. A collar 26 is adjustably mounted on the leg 19 above the sleeve 22 whereby the position of the collar regulates the spacing between the forward end of the side rail 11 from the ground; however, the connector is such that said side rail may be moved upwardly when passing over uneven ground but the minimum spacing is regulated so the forward end of the loading mechanism will not strike the ground. The connection 3 serves as a hitch of the bale loading machine to the wagon or the like 4 and cooperates with the ground-engaging wheels 6 at the rearward portion of the frame to form the sole supports for the bale loading machine during loading operations.

The rear ends of the side rails 10 and 11 are connected to the transverse member 12 which has a plurality of spaced upstanding brackets 27 thereon carrying bearing members 28 which rotatably mount the axle 5. The wheels 6 each have an overrunning clutch connection with the axle 5 whereby when the wheels are turned during forward movement of the loading machine, they will turn the axle, but during rearward movement of the machine the axle will remain stationary, as later described. A sprocket 29 is fixed to the axle 5 substantially midway between the wheels 6 and is adapted to drive the elevating conveyor 9 as later described. The transverse member 12 includes a guard member in the form of a ring 30 which surrounds the sprocket 29. The upstanding frame portion or standard 7 includes spaced structural members 31 and 32 having their lower ends fastened as at 33 to the transverse member 12 and their upper ends are connected as at 33' to arms 34 which have ends connected as at 35 to an upstanding plate member 36 adjacent the upper portion of the upstanding frame portion or standards 7. The arms 34 converge rearwardly from the plate member 36 and have their rear ends connected to a clevis or hitch member 37 adapted to be connected to a hitch of a trailer or the like as illustrated in Fig. 4, when the loading machine is to be moved from one location to another, during which movement the loading machine is supported by the wheels 6 and the clevis or hitch member 37.

The frame portion or standards 7 also includes upstanding members 38 having the lower ends secured to the side rails 10 and 11 in spaced relation to the transverse member 12 with the upper ends thereof connected to horizontal members 39 arranged in a substantially open square slightly larger than the width or diameter of a bale to be loaded. The side members of said open square frame 40 are secured to the upper ends of flat sheet metal side wall members 41 which have their lower ends secured as at 42 to the side rails 10 and 11, said sheet metal forming side guides for the bale being elevated. The rear member of the square frame 40 is suitably secured to the lower edge of the plate member 36 which extends upwardly therefrom approximately the length of a bale. The side member of the square frame 40 adjacent to the wagon or the like has spaced strips 43 secured thereto and extending outwardly and downwardly therefrom with the outer ends secured to a bar 44 having its ends connected to brace rods 45 and 46 connected to the plate member 36 and the upright member 38 to form the discharge platform 8.

A channel shaped track 47 is arranged to provide an open trough having the opening thereof facing forwardly of the machine with the lower end of said channel member supported by arms 48 suitably connected to the guard member 30 and transverse member 12 whereby said lower end is spaced forwardly from the sprocket 29 and is substantially in the same plane as the sprocket. The upper portion of the channel member 47 slopes rearwardly and extends through a slot 49 in the plate 36, the upper portion of the channel track member 47 being secured to the frame 40 and plate member 36 and is suitably braced as by brace members 50 to provide a rigid structure. An endless chain 51 has its rearward run 52 engaging the teeth at the forward portion of the sprocket 29 and then extends around a sprocket 53 rotatably mounted on bearing members 54 whereby the chain operates under the sprocket 53 and the forward run 55 is guided upwardly in the trough of the channel member 47. The chain operates over a sprocket 56 rotatably mounted in bearings 57 adjustably supported on the upper end of the channel member 47, the bearings 57 being arranged on supports 58 slidably mounted in guides 59 and connected to a bar 60 with a screw 61 arranged between the bar 60 and the guides 59 for moving said supports 58 to tighten the chain. Spaced teeth 62 are mounted on the chain and adapted to extend into bales and take a bite on same to elevate the bale in the machine.

A bale press and guide member 63 is carried on the frame in forwardly spaced relation to the conveyor chain 51 and serves to resiliently press the bales in contact with the teeth 62 during their movement toward the platform 8. The guide press member is preferably formed of sheet metal and has an elongated portion 64 of a width less than the width of the bale which terminates in its lower end in a forwardly curved portion 65 normally spaced from the ground a distance slightly greater than the vertical thickness of the bale. The curved lower end 65 is secured to a bearing member 66 rotatably mounted on a shaft 67 extending transversely of and above the side rails 10 and 11. The shaft 67 terminates in arms 68 which extend forwardly and downwardly and terminates in trunnions 69 rotatably mounted in bearings 70 carried by the respective side rails. A spring 71 has one end secured as at 72 to the shaft 67 and the other end secured as at 73 to the side rail 10 to swing the shaft 67 rearwardly toward the chain 51. The elongated portion 64 extends upwardly and rearwardly substantially parallel to the channel member 47 to a line spaced below the frame 40 and terminates in a susbtantially vertical portion 74 that extends above the frame 40 approximately to the height of the plate 36 which is approximately a distance above the frame 40 corresponding substantially to the length of the bale. The upper portion of the sheet 64 has a lateral extension 75 extending partially over the platform 8 to cooperate with the plate 36 to guide the bale on to the platform 8. The presser guide 63 preferably has longitudinal ribs 76 to stiffen same. A bar 77 is arranged substantially in a U-form with its ends connected to the ribs 76 adjacent the intersection of the portions 64 and 74 whereby the bar extends forwardly therefrom. Springs 78 have ends connected as at 79 to the central portion of the bar member 77 and their other ends connected to a flexible member 80 which extends over the forward member of the frame 40 and is connected to a rod 81 extending between the ends of the bar 77 whereby the spring tension of the springs 78 is adjustable to support the upper portion of the presser guide and urge same toward the conveyor to resiliently urge the bale into engagement with said conveyor. A resilient strip 82 has its lower end secured to the side of the frame 40 remote from the platform 8 and curves upwardly and toward the platform side and is connected adjacent its upward end to a bar member 83 that is connected to the plate 36 whereby the member 82 engages the bale during its upward travel above the frame 40 and tilts same on to the platform 8. A bar 84 has its upper end connected to the platform 8 and extends downwardly therefrom and is supported by braces 85 whereby the lower end of said bar is spaced laterally of the wheel 6 adjacent to the wagon to maintain the spacing therebetween.

In the overrunning clutch connection between the wheels 6 and the axle 5, the wheels 6 each have hubs 86 rotatably mounted on suitable bearings on the axle 5, said hubs having drums 87 fixed thereto and provided with spaced lugs 88 around the inner surface of said drums. The axle has arms 89 fixed thereto and extending therefrom inside the drum. Pawls 90 are pivotally mounted on the arms 89 whereby the ends of said pawls are engageable with the lugs 88. Springs 91 are arranged on the arms 89 normally urging the pawls into engagement with stops 92 on said arms at which position rotation of the wheels 6 in a forward, clockwise direction, Fig. 6, the lugs engage the pawls and rotate the axle 5. Rearward movement wherein the wheels turn in a counter-clockwise direction, Fig. 6, allows the pawls to move by the lugs whereby the rotation of the wheels do not turn the axle. Higher speed in a rearward direction will cause the lugs to strike the pawls with an impact that will throw them into the position shown in dotted lines, Fig. 6, and in that position the springs 91 pass by the pivot axis of the pawls and hold them in inoperative position until the pawls are moved manually to operative position by means of handles 93 extending through slots 94 in plates 95 fixed on the axle and closing the openings of the drums.

In operating a bale loading machine constructed as described, the machine is tipped over rearwardly whereby the upstanding frame portion or standard is held above the ground by the wheels 6 and the clevis 37 and the side rails 10 and 11 extend upwardly from adjacent the wheels 6. Then the clevis 37 is connected to a suitable hitch 96 of a tractor or other suitable vehicle for towing to a location where it is desired to load bales. Due to the arrangement of the side rails and conveyor, the dimensions of the machine are such that when in towing position the leg 19 is the uppermost part of the machine and it is well below the height limits provided by government regulations for use on a highway. As the machine is being towed behind a suitable vehicle, the wheels 6 rotate in a counterclockwise direction, Fig. 6, and the pawls 90 move to the inoperative position where they are completely disengaged from the lugs 88 during higher speeds whereby the wheels turn freely on the axle 5 and said axle and the conveying mechanism driven thereby remain idle. This permits the machine to be towed for substantial distances without wear on the conveyor parts and drive of the bale loading machine.

When the site for loading of bales is reached, the clevis 37 is disconnected from the tractor or other vehicle and then the machine is tipped forwardly to the position illustrated in Fig. 3. It is to be noted that due to the location of the wheels 6 and the relative weights of the portions of the machine, it will remain in the relative positions shown in Figs. 3 and 4 until the lower end is lifted and the machine is tilted; however, the position of the wheels is such that the weight required to be lifted for tilting of the machine is small and one man can easily move it from towing position to loading position. When the machine is in loading position as illustrated in Fig. 3, the connector 3 is secured to a wagon or truck and the collar 26 adjusted on the leg 19 whereby the side rail 11 is substantially parallel to the ground, the leg 19 being pivoted in the sleeve 22 of the connector 3. The forward end of the side rails may move upwardly relative to the truck bed but is held against downward movement by the collar 26 and the loading machine may swing relative to the wagon bed to properly move alongside thereof during operation. When the loading machine is properly connected to a wagon or truck, the pawls 90 are moved to operative position to be engaged by the lugs 88 to drive the axle 5. Then said wagon or truck is moved alongside a row of bales to be picked up and loaded whereby said row of bales can enter between the legs 19 and 20 of the arch member 15. As the bales enter and contact the side rails 10 and 11, the bales are straightened and guided between the parallel portions thereof and under the curved portion 65 of the presser guide 63. As the machine progresses forwardly, the wheels 6 rotate and the lugs 88 of the pawls engage the pawls 90 on the arms 89 fixed to the axle 5 whereby the rotation of the wheels rotates the sprocket 29 driving the rear run 52 of the chain 51 downwardly and the forward run 55 of the chain upwardly in the channel member 47. The lower sprocket 53 is below the upper surface of the bales on the ground whereby the teeth 62 engage the ends of the bales to start lifting them. When the teeth 62 on the conveyor chain engage the rear portion of a bale, they extend into said bale and pick same upwardly to move same between the conveyor chain and the presser guide 63, and during such upward movement, additional teeth 62 enter and engage the bale. During the upward movement, the springs 71 and 78 urge the presser guide 63 against the bale holding same in engagement with the conveyor chain and teeth 62 thereon. As the bale reaches the uppermost portion of its travel, the upper end of the bale engages the member 82 which tilts the bale onto the platform 8 where a man on the truck can reach same with a bale hook and pull it off on to the wagon bed to load as desired. If the bales are close together, the forward bale is held back until the first bale is moved upwardly on the conveyor and then the next bale is engaged by the conveyor and also elevated. If the operator has failed to remove a bale from the platform 8, the next bale will push the first bale off of the platform on to the bed of the wagon. Due to the connection between the machine and the wagon, the machine will trail alongside of the wagon and the bar member 84 will maintain the minimum spacing therebetween. In turning the wagon, however, as to the left, with the structure illustrated, the machine can swing away from the wagon and thereby prevent any interference with the operation. In passing over rough terrain, the leg 19 of the arch member 15 can slide upwardly in the sleeve 22 but its downward movement is limited by the collar 26 whereby the forward end will not engage the ground. When the wagon is completely loaded, the fastening device 25 is removed and the connector 3 disconnected from the wagon whereby said wagon may be moved as desired to convey the bales to a suitable place of storage. While the wagon is being used to transport the loaded bales, the connector 3 of the bale loading machine is connected to another wagon and loading continued. After the bales are loaded and the connector 3 removed from the wagon or truck, the bale loading machine can be quickly tilted rearwardly and the clevis 37 connected to a hitch of a towing vehicle and the bale loading machine moved to another location.

It is believed obvious I have provided a bale loading machine that is economical to manufacture, easily operated and efficient in loading bales with little danger of jamming or other improper operation, and which is easily and quickly tilted from bale loading position to towing position for movement to another site and then returned to loading position with a minimum of labor and with substantially no wear on the operating parts of the machine.

What I claim and desire to secure by Letters Patent is:

In a bale loading machine comprising, a frame having one portion with forwardly extending laterally spaced side rails with outwardly flared forward portions defining an entrance path for bales, said frame having an upstanding portion adjacent the rear of said one portion, a transverse axle, means swingably mounting the upstanding portion of the frame on said axle, ground-engaging wheels rotatably mounted on said axle, said axle being positioned relative to said one portion of the frame whereby said ground-engaging wheels extend below and rearwardly of the most rearward portion of said one portion of the frame and the frame may be swung to position the normally upstanding portion substantially horizontal and spaced from the ground, an endless conveyor on the frame for elevating and lifting bales in an inclined plane from a position on the ground to a delivery position adjacent the top of the upstanding portion of said frame when in normal elevating position, means operatively connecting the axle and conveyor for driving said conveyor for elevating bales in response to rotation of said axle, means operatively connecting the ground-engaging wheels with the axle for rotating said axle only when the frame is moving forwardly, means pivotally connecting the forward end of one of the side rails to one side of a vehicle upon which bales are to be loaded whereby forward movement of said vehicle effects forward movement of the frame and rotation of the ground-engaging wheels to operate the conveyor, arms rigidly fixed on the upper portion of the upstanding portion of the frame and extending upwardly and rearwardly therefrom, said arms terminating in ends rearwardly spaced from the upper end of said upstanding portion of the frame, and hitch means rigidly connected to said ends of the arms whereby upon disconnecting said one side rail from said vehicle the frame is swung rearwardly to position the upstanding portion of the frame substantially horizontally and the hitch means on said arms connected to a towing vehicle to support the frame only by said hitch means and the ground-engaging wheels for rearward towing from one location to another without operation of said conveyor.

References Cited in the file of this patent

UNITED STATES PATENTS

| | | |
|---|---|---|
| 1,256,390 | Stuart | Feb. 12, 1918 |
| 2,144,360 | Buckbee | Jan. 17, 1939 |
| 2,343,133 | Blank | Feb. 29, 1944 |
| 2,372,902 | Lewis | Apr. 3, 1945 |
| 2,483,290 | Mayrath | Sept. 27, 1949 |
| 2,656,030 | Smoker | Oct. 20, 1953 |
| 2,706,046 | Andrews | Apr. 12, 1955 |
| 2,785,810 | Kneib | Mar. 19, 1957 |